United States Patent [19]

Watts

[11] Patent Number: 4,461,948
[45] Date of Patent: Jul. 24, 1984

[54] COLLET SYSTEM FOR ARC WELDING TORCHES

[76] Inventor: Donald R. Watts, 6004 - 4th Street Ct. NE., Tacoma, Wash. 98422

[21] Appl. No.: 286,018

[22] Filed: Jul. 22, 1981

Related U.S. Application Data

[63] Continuation-in-part of Ser. No. 278,679, Jun. 29, 1981, abandoned.

[51] Int. Cl.³ .......................... B23K 9/28; B23B 31/10
[52] U.S. Cl. ..................................... 219/136; 219/75; 219/138; 279/51
[58] Field of Search ............... 219/136, 72, 74, 75, 219/138; 279/46 R, 51, 52, 53; 403/372, 365

[56] References Cited

U.S. PATENT DOCUMENTS

| | | | |
|---|---|---|---|
| 2,890,072 | 6/1959 | Kaman et al. | 403/365 |
| 3,125,667 | 3/1964 | Oyler | 219/75 |
| 3,171,663 | 3/1965 | Stark | 279/51 |
| 3,250,889 | 5/1966 | Himmelman | 219/75 |
| 3,263,056 | 7/1966 | Tallman | 219/75 |
| 4,354,088 | 10/1982 | Rehrig | 219/75 |

Primary Examiner—B. A. Reynolds
Assistant Examiner—Alfred S. Keve
Attorney, Agent, or Firm—David L. Garrison; Ford E. Smith

[57] ABSTRACT

The invention is an improved collet design for arc welding torches. The collet tip is asymmetrically tapered. The collet tip bears on the interior surface of an adjacent sleeve which is appropriately flared in the rearward direction so as to receive the tapered collet tip. The sleeve also has an opening through which the electrode passes. The asymmetry of the collet-sleeve interaction causes the collet to be laterally displaced thereby gripping the electrode between the collet and the sleeve opening.

The improved collet also includes a spring fastener means for connecting the rear end of the collet to the back cap of the torch head.

4 Claims, 7 Drawing Figures

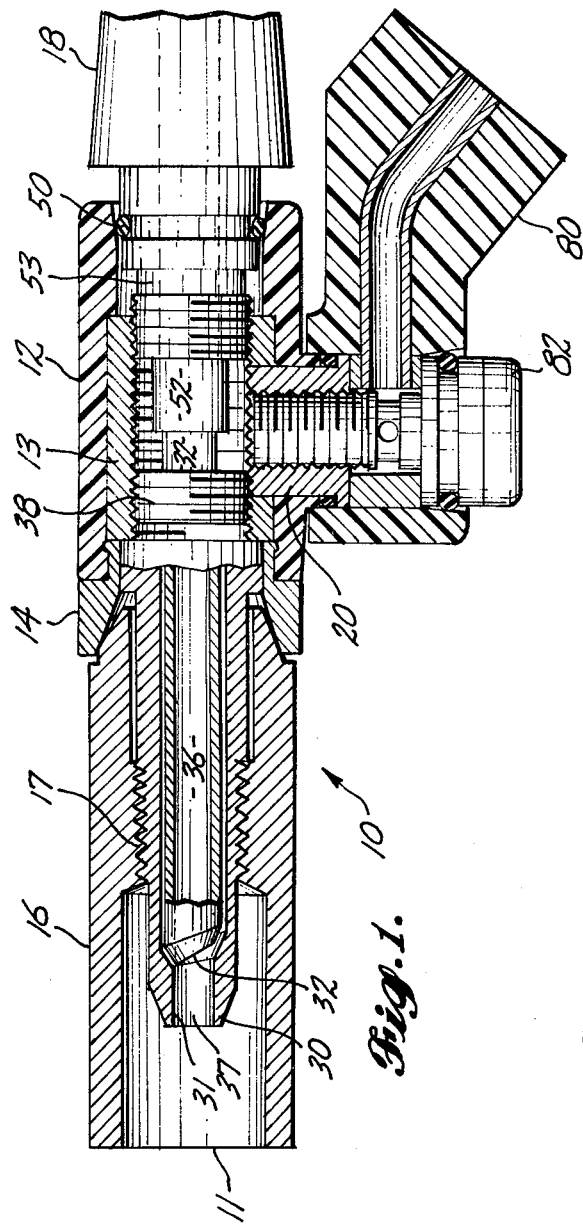
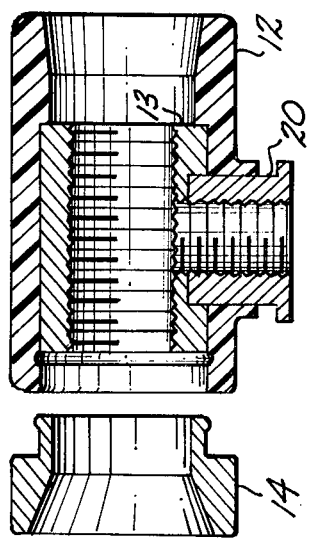

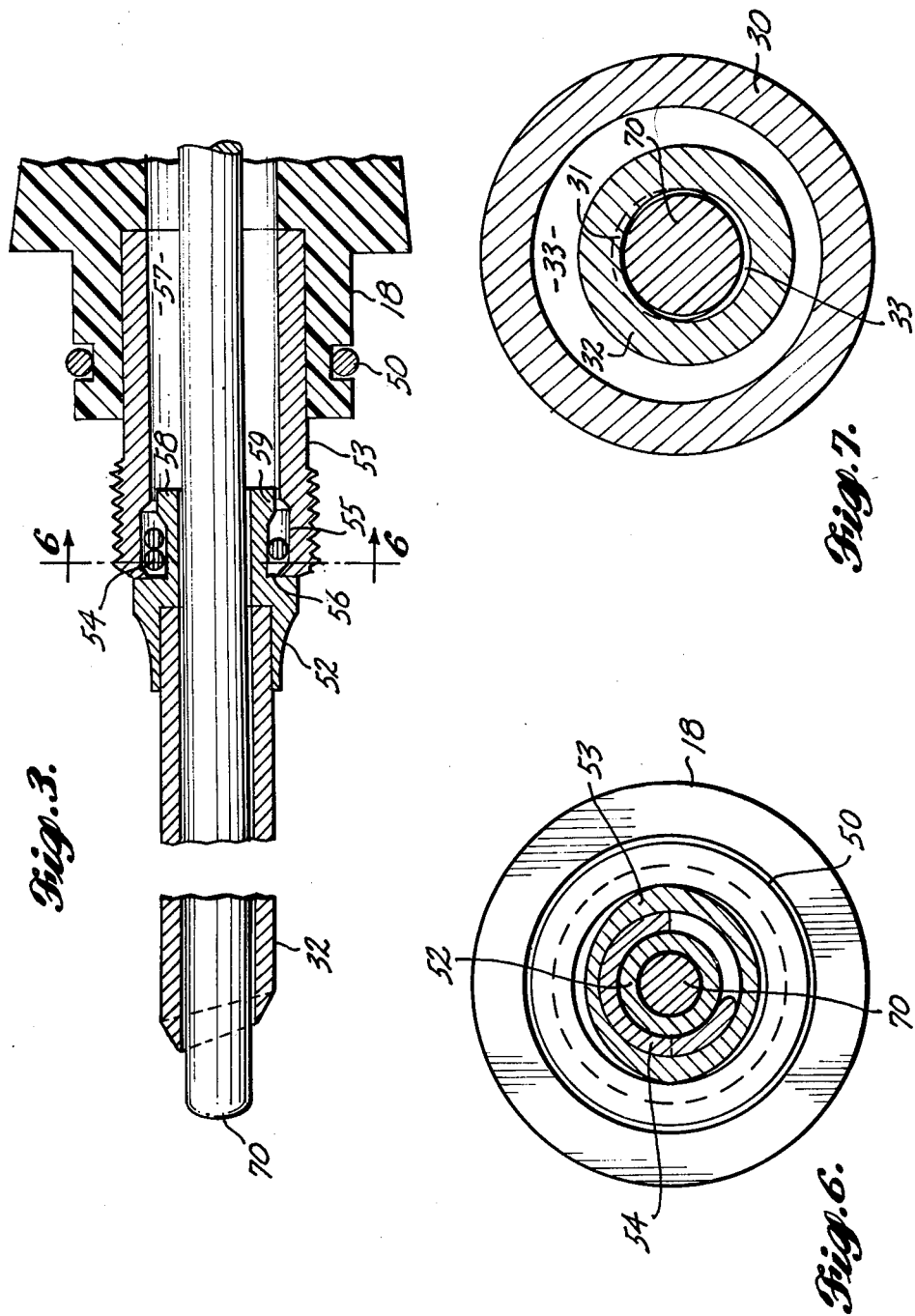

ing in the back cap. The insertable end is provided with a fastening means for fastening the ferrule to the back cap. A preferred fastening means is an annular ridge on the insertable end which snaps into the opening in the back cap to hold the ferrule within the opening. The ridge size is such that it can be forced over the sides of the opening in the back cap by pushing the ferrule into the opening. Similarly the ferrule can be removed by forcefully pulling the ferrule out of the opening.

COLLET SYSTEM FOR ARC WELDING TORCHES

DESCRIPTION

This application is a continuation-in-part of my previous application entitled GAS SHIELDED ELECTRIC WELDING TORCH, Ser. No. 278,679, filed June 29, 1981, now abandoned.

TECHNICAL FIELD

The technical field of this invention is electrical welding equipment. More specifically it relates to a collet means for holding an electrode in an arc welding torch and means for fastening the collet to the torch back cap.

BACKGROUND ART

Prior art arc welding torches often use collets for holding the welding electrode. Some collets are made in a tubular shape having an enlarged rear end which is pressed upon by a back cap. The collet is split longitudinally at two or more thin slots to allow the front end or tip of the collet to be compressed when the tip is forced against the interior conical shape of an adjacent sleeve which surrounds the collet tip. This compresion of the collet causes the collet to engage and hold the electrode.

The conical interior surface of the sleeve tends to center the collet within the sleeve. Usually the electrode is centered and touching only the collet thus causing all the electrical current to pass through the collet in order to reach the electrode. Because the collet is compressed against the electrode over a relatively small area, the current density is large and substantial heat is released. This heat causes the part of the electrode engaged by the collet to expand. The expanded electrode tends to stick in the collet making the electrode difficult to withdraw and adjust, which is needed when the electrode slowly disintegrates during welding. The difficulty in withdrawing the electrode often forces welders to remove the collet assembly from the torch. If the welder drops the electrode or collet this can lead to additional lost time and expense.

Prior art collets also tend to support the electrode in a somewhat unstable manner caused by movement of the collet within the torch head. This instability makes welding more difficult.

Prior art collets are costly to manufacture because of the machining of the thin slots or other configurations. Collets are often bored twice in the interior to limit the area over which the electrode is engaged by the collet. These machining steps are eliminated by the invention.

A further limitation of prior art collets is that they are not connected to the back cap. When the electrode is removed from the torch the back cap is unscrewed, the torch is rotated, and the collet and electrode are dumped out. Thus, the collet and electrode are often dropped or lost thus causing lost time or replacement of lost parts.

DISCLOSURE OF INVENTION

It is an object of the invention to provide a collet system for arc welding torches which will allow easy withdrawal and adjustment of the electrode.

It is an object of the invention to provide a collet system which reduces or eliminates electric current flow through the collet.

It is another object of the invention to provide a collet design where the electrode is held between the collet and an adjacent sleeve, whereby the electrode is more securely mounted within the torch.

It is an object of the invention to provide a collet without longitudinal flexibility slots or other complex features and is simple to manufacture.

It is a further object of the invention to provide a collet having a means for securing the collet to the back cap of the torch so that the collet and electrode are withdrawn as the back cap is removed.

The invention uses a tubular collet which surrounds an arc welding electrode. The tubular collet has an inside diameter which is slightly larger than the outside diameter of the electrode. The collet tip is provided with a tapered shape which is preferably asymmetrically conical. The asymmetrically conical shape can be visualized by having the longitudinal axis of the conical shaped tip parallel to the longitudinal axis of the collet but offset by a small distance. The offset of the conical shape causes one side of the collet to be longer than the opposing side and the collet tip to be obliquely angled. The conical tip of the collet is angled to the longitudinal axis at substantially the same angle all arount the tip. The preferred angle is approximately 30° (60° included conic angle), although a substantial variation in the angle can occur consistent with the relative sizes of the electrode, collet and sleeve, and the coefficient of friction between the collet and sleeve.

The collet is inserted into a torch head having a sleeve therein. The sleeve has an opening at the forward end to allow an electrode to pass therethrough. Adjacent to the opening is a rearwardly flaring interior surface. This surface is abutted by the collet tip and preferably has a corresponding shape. The surface is preferably conical with an angle corresponding to that of the collet tip.

When the collet is pressed into the inside conical surface of the sleeve the collet tends to be displaced laterally. This lateral displacement of the collet also forces the enclosed electrode laterally and crowds it against the inside wall of the adjacent opening in the sleeve. The electrode is caught in a bind between the laterally displaced collet and the sleeve opening thereby securely holding it within the torch.

In one alternative embodiment of the invention the rearwardly flaring interior surface is asymmetrically positioned within the sleeve and relative to the sleeve opening. Alternatively, the sleeve opening can be asymmetrically located with respect to the symmetrically located rewardly flaring interior surface. A collet having a symmetrical tip would be used in these embodiments.

One side of the electrode contacts the inside diameter of the sleeve opening along the entire length of the opening. This provides a large contact area over which electrical current can pass from the sleeve to the electrode without going through the collet. The large contact area reduces the current density and temperature compared to prior art collets. This arrangement also places the area of greatest temperature increase outside the relatively close fitting collet.

The invention also includes a means for fastening the rear end of the collet to the backcap of the torch. The rear end of the collet is provided with a ferrule which can be pressed onto or otherwise affixed to the tubular collet. The ferrule usually has a larger outside diameter than the collet for abutting the back cap. The ferrule also has an insertable end for insertion through an opening into the bore of the back cap. Arranged around the insertable end is a small spring. The spring is held onto the end by an enlarged outside diameter at the end of the ferrule. The bore of the back cap is smaller than the outside diameter of the spring to retain the ferrule within the back cap.

Just in from the face of the back cap is a relieved area where the inside diameter of the bore increases to approximately the same size as the outside diameter of the spring. Thus when the insertable end of the ferrule, complete with spring, is forced through the reduced bore of the back cap, the collet is held to the back cap in slightly loose fitting assembly. The back cap and collet can easily be joined or separated by pressing the collet at an angle and rotating with respect to the back cap. The assembly of the back cap and collet enable a welder to easily extract the collet and electrode from the torch head with less chance that the electrode or collet will fall out and be lost.

BRIEF DESCRIPTION OF THE DRAWINGS

FIG. 1 is a side elevational view of a torch head incorporating the improved collet of the invention. Portions have been removed and are shown in section.

FIG. 2 is an enlarged sectional side view of the central section of the torch head of FIG. 1, with the collet, electrode and back cap removed.

FIG. 3 is an enlarged side view of the collet and back cap shown in FIG. 1. Portions have been removed and are shown in section.

FIG. 6 is a sectional view taken along line 6—6 of FIG. 3.

FIG. 7 is a sectional view taken along line 7—7 of FIG. 5.

BEST MODE OF CARRYING OUT THE INVENTION

Figure 4:
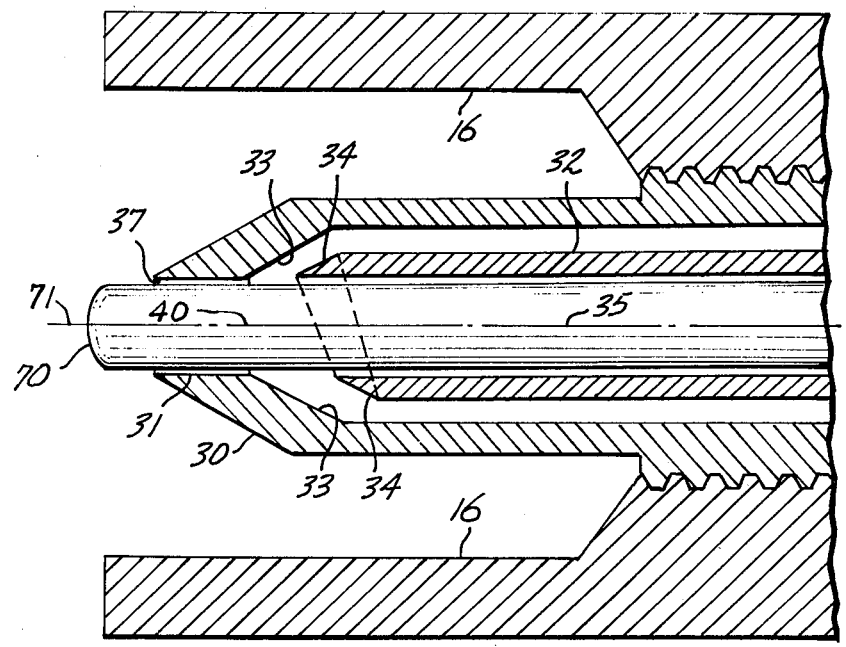
FIG. 4 is an enlarged side view of the forward end of the torch head of FIG. 1. The collet tip is not contacting the rearwardly flaring surface of the sleeve.

Shown in FIG. 1 is a torch head 10 which incorporates the improved collet system of the invention. The torch head 10 is connected to the torch handle 80 by fastener 82. Fastener 82 is screwed into receiving piece 20. Central body piece 12 has a threaded sleeve 13 positioned therein (refer to FIG. 2). Central body piece 12 is made of a dielectric material such as heat resistant plastic. Threaded sleeve 13 is made of electrically conductive material such as brass and is electrically connected to receiving piece 20.

Back cap 18 has a threaded insert 53 securely located therein for advancing into threaded sleeve 13. As threaded insert 53 advances it moves collet ferrule 52 axially toward the forward end 11 of torch 10. Back cap 18 also has an 0-ring 50 which prevents gas from leaking from the torch head at its periphery.

FIG. 4 shows the forward end of torch head 10. Collet 32 contains electrode 70 and is surrounded by sleeve 30. The forward end of collet 32 has an conical collet surface 34. The conical collet surface has a longitudinal conic axis (not shown) which is substantially parallel to but outset from the longitudinal axis 35 of collet 32. An offset of approximately 0.015 inches is appropriate for common sizes of collets.

Figure 5:
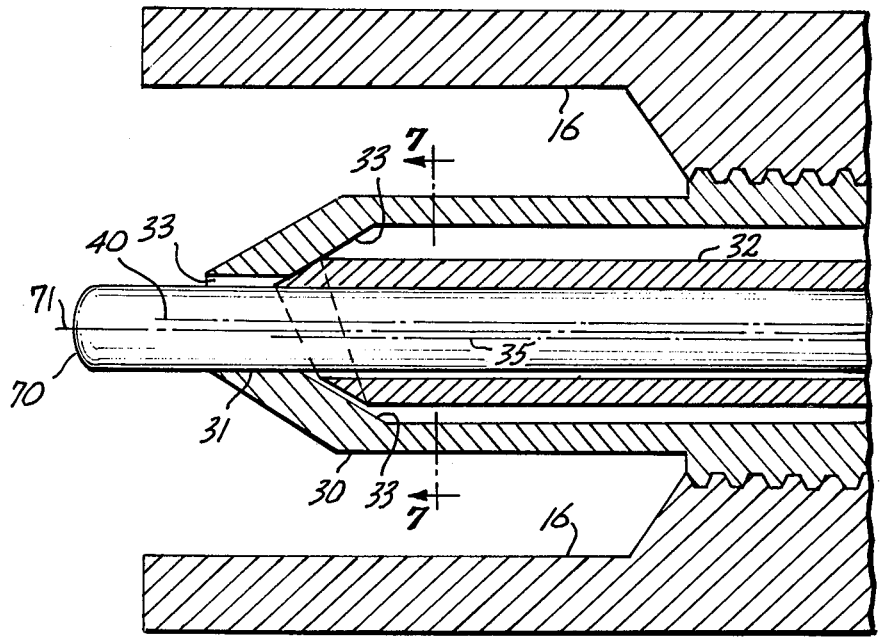
FIG. 5 is the same as FIG. 4 except the collet tip has been pressed against the rearwardly flaring surface of the sleeve, thereby displacing the collet and electrode laterally.

Conical collet surface 34 interacts with rearwardly flaring surface 33 which is also conical. When collet 32 is pressed forward by threaded insert 53 collet surface 34 engages sleeve surface 33 at the forwardmost point. The angles of surfaces 33 and 34 allows them to slide relative to each other thereby causing collet 32 to be displaced laterally, as shown in FIG. 5.

Collet 32 is displaced laterally until the inside thereof contacts electrode 70 and forces it laterally. Further pressing of collet 32 causes electrode 70 to contact the inside diameter 31 of sleeve opening 37. In this manner electrode 70 is bound between collet 32 and sleeve 30 thereby securely holding the electrode 70 within torch head 10. In this bound position the longitudinal axis 35 of the collet and the longitudinal axis 71 of the electrode are displaced downward from the longitudinal axis 40 of the sleeve.

Sleeve 30 is provided with a threaded rear end 38 which is screwed into threaded sleeve 13 (FIG. 1). Sleeve 30 also has an insulative sleeve 16 which is mounted on sleeve 30 by threads 17. Further insulative protection is provided by collar 14.

When the torch of the invention is operated, electricity flows through receiving piece 20 and threaded sleeve 13 to sleeve 30. From sleeve 30 electricity flows to the electrode via the contact between inside diameter 31 and the electrode 70. Such an arrangement provides a relatively large contact area and eliminates or reduces current flow through the collet 32.

When the electrode 70 needs to be repositioned, the back cap 18 is rotated to relieve the pressure upon collet 32. The electrode 70 is no longer bound by the collet 32 and sleeve 30 so it is free to be withdrawn and adjusted as needed. When the electrode is properly positioned the back cap 18 is tightened and the collet 32 and sleeve 30 once again bind the electrode 70 to securely hold it in torch head 10.

The collets 32 of the invention can be made of a variety of materials. It is preferable that it be made of conductive materials such as stainless steel, brass or beryllium copper. The collet 32 can be made by taking a appropriately sized piece of tubing and using a rotating machine tool having an interior cutting angle equal to the included conic angle. The longitudinal axis of the machine tool and tubing are offset during cutting to provide the asymmetric collet tip.

The sleeve 30 can be made of similar materials and can be of a style which is well known in the art of welding equipment. The novel collet 32 has been designed for installation within commonly available prior art sleeves 30.

The invention also includes a novel means for attaching the collet 32 to the back cap 18. As shown in FIG. 3 the collet 32 is provided with a collet ferrule 52. Ferrule 52 has a flange 56 which positions it relative the threaded insert 53. Collet ferrule 52 has a insertable end 58 which is properly sized to fit into cylindrical opening 57 of threaded insert 53. Insertable end 58 has a enlarged end 59 which serves to retain spring 54 on insertable end 58. Spring 54 is preferably only 1–2 turns thereby allowing easy insertion and removal of the insertable end 58. Insertion or removal is accomplished by angleing the collet 32 with respect to the back cap 18 and rotating, thereby causing the spring to work in or out of the internal relieved area 55 of insert 53.

INDUSTRIAL APPLICABILITY

The improved collet system of the invention can be used with well known arc welding torches having sleeves which are appropriately sized and shaped to receive the novel collet tip. The invention is particularly applicable to inert gas welding torches using relatively non-consumable electrodes such as tungsten electrodes in a TIG welding system.

It will be apparent to those skilled in the pertinent arts that minor modifications can be made to the invention consistent with the above disclosure. These modifications are to be liberally interpreted within the scope of the below claims.

What is claimed is:

1. In a welding torch for holding an electrode extending through a forwardly open passage therein, a gripping means for gripping an electrode, comprising:
    a sleeve means having an interior rearwardly flaring surface adjacent said forwardly open passage, said open passage having an inside wall adapted to engage an electrode;
    a tubular collet within said torch having a tapered forward end for bearing on said rearwardly flaring surface;
    means to drive said tubular collet against said rearwardly flaring surface; and
    the taper of said tubular collet and the flare of said rearwardly flaring surface being asymmetrical with respect to each other, whereby relative axial movement to engage said rearwardly flaring surface and said collet displaces said collet laterally and binds an electrode between said collet and said inside wall.

2. The gripping means of claim 1 wherein said interior rearwardly flaring surface is substantially conical and said tapered forward end of said collet is substantially asymmetric with respect to said collet.

3. The gripping means of claim 2 wherein said interior rearwardly flaring surface is asymmetrical and said tubular collet has a substantially conical forward end.

4. In a welding torch having a tubular collet for holding an electrode, said collet having a means for fastening the collet to a torch back cap, comprising:
    a collet ferrule attached to said collet and having a insertable end opposite said collet;
    a spring arranged around said insertable end and held thereon by an elarged portion of said insertable end;
    a back cap having an opening smaller than said spring and a bore thereto having a relieved portion therein; whereby said insertable end is retained in said back cap;
    a passage in said collet to receive an electrode;
    an asymmetrically tapered forward end to said collet;
    a sleeve means having an interior rearwardly flaring surface adjacent an open passage there through, said open passage having an inside wall adapted to engage an electrode; and
    means to drive said tubular collet against said rearwardly flaring surface; whereby driving pressure on said collet relative the rearwardly flaring surface crowds said collet laterally thereby gripping an electrode between said collet and said inside wall.

* * * * *